United States Patent
Stewart et al.

(10) Patent No.: US 10,572,528 B2
(45) Date of Patent: Feb. 25, 2020

(54) SYSTEM AND METHOD FOR AUTOMATIC DETECTION AND CLUSTERING OF ARTICLES USING MULTIMEDIA INFORMATION

(71) Applicant: INTERNATIONAL BUSINESS MACHINES CORPORATION, Armonk, NY (US)

(72) Inventors: Osamuyimen Stewart, Nairobi (KI); Komminist Weldemariam, Nairobi (KE); Mattia Zeni, Trento (IT)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 15/234,921

(22) Filed: Aug. 11, 2016

(65) Prior Publication Data

US 2018/0046708 A1    Feb. 15, 2018

(51) Int. Cl.
*G06F 16/35* (2019.01)
*G06K 9/00* (2006.01)
*G06F 16/51* (2019.01)
*G06F 16/338* (2019.01)
*G06F 16/583* (2019.01)

(52) U.S. Cl.
CPC .......... *G06F 16/358* (2019.01); *G06F 16/338* (2019.01); *G06F 16/51* (2019.01); *G06F 16/583* (2019.01); *G06K 9/00456* (2013.01)

(58) Field of Classification Search
CPC ......... G06F 17/30867; G06F 17/30011; G06F 17/30247; G06F 17/30705; G06F 17/30713
See application file for complete search history.

(56) References Cited

U.S. PATENT DOCUMENTS

| | | | |
|---|---|---|---|
| 6,298,173 B1 | 10/2001 | Lopresti | |
| 6,640,010 B2 | 10/2003 | Seeger et al. | |
| 8,131,702 B1* | 3/2012 | Bharat | G06F 17/3071 707/706 |
| 8,824,803 B2 | 9/2014 | Reese et al. | |
| 2006/0062492 A1 | 3/2006 | Masuichi et al. | |
| 2009/0048990 A1* | 2/2009 | Gross | G06F 17/30867 706/12 |
| 2009/0094233 A1* | 4/2009 | Marvit | G06F 16/313 707/999.005 |
| 2012/0005242 A1* | 1/2012 | Feng | G06Q 10/0639 707/805 |
| 2014/0282009 A1* | 9/2014 | Avrahami | G06F 3/04845 715/730 |

(Continued)

OTHER PUBLICATIONS

Hebert et al. "Automatic article extraction in old newspapers digitized collections." Proceedings of the First International Conference on Digital Access to Textual Cultural Heritage. ACM, 2014, May 19-20, 2014, pp. 3-8.

(Continued)

*Primary Examiner* — Yuk Ting Choi
(74) *Attorney, Agent, or Firm* — Eyal Gilboa; Otterstedt, Wallace & Kammer, LLP

(57) ABSTRACT

The disclosure provides methods and systems that automatically detect and cluster related articles in a publication for archival, search, and other purposes. Text and images are recognized and scored in order to cluster related content into coherent and searchable articles.

17 Claims, 5 Drawing Sheets

(56) References Cited

U.S. PATENT DOCUMENTS

| | | | | |
|---|---|---|---|---|
| 2015/0149468 A1* | 5/2015 | Shukla | ............... | G06K 9/00684 |
| | | | | 707/740 |
| 2016/0071119 A1* | 3/2016 | Blanchflower | ..... | G06F 17/2785 |
| | | | | 705/7.29 |
| 2016/0321783 A1* | 11/2016 | Citrin | .................... | G06T 3/4038 |
| | | | | 707/999.005 |
| 2017/0161580 A1* | 6/2017 | Chulinin | .............. | G06K 9/3208 |
| | | | | 707/706 |

OTHER PUBLICATIONS

Bansal et al. "Newspaper article extraction using hierarchical fixed point model." Document Analysis Systems (DAS), 2014 11th IAPR International Workshop on. IEEE, 2014, pp. 257-261.

Gatos et al. "Automatic page analysis for the creation of a digital library from newspaper archives." International Journal on Digital Libraries 3.1 (2000): 77-84.

Niyogi et al., "Use of document structure analysis to retrieve information from documents in digital libraries." Electronic Imaging'97. International Society for Optics and Photonics, 1997, pp. 1-12.

Ariki Y, Teranishi T. Indexing and classification of TV news articles based on telop recognition. InDocument Analysis and Recognition, 1997., Proceedings of the Fourth International Conference on Aug. 18, 1997 (vol. 1, pp. 422-427). IEEE.

Ariki Y, Matsuura K. Automatic classification of TV news articles based on telop character recognition. Inicmcs Jun. 7, 1999 (p. 148). IEEE (Abstract pp. 1-3).

\* cited by examiner

SYSTEM AND METHOD FOR AUTOMATIC DETECTION AND CLUSTERING OF ARTICLES USING MULTIMEDIA INFORMATION

FIELD OF THE INVENTION

In embodiments, the technical field of the invention is digital processing methods and systems for automatically processing articles in a publication.

BACKGROUND

A newspaper is a printed document that contains informative articles about different topics. Usually they are printed on relatively inexpensive, low-grade paper. Newspaper articles are composed by different elements and can span on one or multiple pages: one title, one or more subtitles, one author, one or more text boxes containing the article corpus, and recently almost every article is associated with one or more images. Furthermore, one newspaper page typically contains multiple articles.

The conversion of newspaper pages into digital resources is an important task that greatly contributes to the preservation and access to newspaper archives. Moreover, in developing countries such as Africa where digital data are still sparse and difficult to gather, digitalized newspapers can extend the available data, enriching the amount of information available. While traditional paper based newspapers are easy to distribute to resource constrained areas, digitized newspapers would enable more intelligent online and offline services such as: smart search tools for journalists timeline and sentiment; and predictive analytics for generating articles templates.

In document digitalization, newspaper article extraction remains an open problem due to the complexity and variety of multi-article page layouts. The process that is typically used to digitalize newspapers is very complex and comprehends different phases: scan the document; segment the page into its structural and logical units (zones or regions); label the detected zones based on their types: title, text, images, lines, tables; extract the articles in which all the elements belonging to the same articles are clustered; and identify the reading order for the clustered elements.

The most challenging problem in the digitalization process is the article extraction. Different solutions have been proposed previously: use layout based information (rules) to detect the elements belonging to the same article; use the text content in the page to determine which text blocks belong to the same article; analyze the text content to extract the topics and use this information to merge the text boxes; or use syntactic rules to determine consecutive text boxes. However, challenges remain with these methods, such as those that follow.

First, newspaper pages may appear in a variety of formats without necessarily a common structure. This occurs in part because of repeated changes in layout habits through time, changes in editorial staff, and the like. Some newspapers may tend to have the bulk of a story on a single page, with only a small portion continued on a subsequent page, whereas others may have small portions of the story spread onto several pages. Second, newspapers are not meant to be red iteratively: the reader can choose his/her own elements and read them in any order he or she prefers. A single page may contain six or more story fragments, and the reader can elect to read each story serially or several stories in parallel. Third, the quality of the scanned documents to be digitalized is often very poor due to low print quality or deterioration through time. Portions of an article may be missing or blurred or otherwise unreadable, including the portion that instructs the reader where to find the continuation of an article on a subsequent page. Finally, newspaper pages have a very complex structure, in particular those where the text columns are located very close to each other or are formatted to follow the outline of an image. Different components may be placed in random positions depending on the content.

The present invention is intended to address one or more of the above-mentioned difficulties in order to provide more useful digital data from old newspapers and other print publications.

SUMMARY OF THE INVENTION

In an aspect is a method comprising the steps: (a) analyzing a text object of an electronic document and identifying a text topic associated with the text object; (b) analyzing an image object of the document and identifying an image topic associated with the image object; (c) determining a degree of closeness between the text topic and the image topic; and (d) when the degree of closeness exceeds a threshold, clustering the text object with the image object to form a clustered article, and adding the clustered article to an indexed database.

In an aspect is a method comprising the steps: (a) analyzing a text object of an electronic document and identifying a text topic associated with the text object; (b) analyzing an image object of the document and identifying an image topic associated with the image object; (c) determining a degree of closeness between the text topic and the image topic; (d) when the degree of closeness exceeds a threshold, clustering the text object with the image object to form a clustered article, and adding the clustered article to an indexed database; and (e) altering a user interface to output the clustered article. In embodiments:

the method is a method of clustering related objects in an electronic document;

steps (a)-(e) are carried out by a system, wherein the system comprises an input device and an output device;

steps (a)-(e) are carried out by a system comprising a processor, a memory coupled to the processor, an input device, and an output device;

the method further comprises inputting the electronic document into the memory of the system via the input device;

the method further comprises outputting the clustered article via the output device;

the input device is selected from an optical scanner, a data link to a data network, a port configured to receive a portable data storage medium, and an input device configured to read a portable data storage medium;

the output device is selected from a printer, an optical display, a non-volatile data storage medium, a data link to a data network, a port configured to receive a portable data storage medium, and an output device configured to read/write a portable data storage medium;

the method further comprises analyzing a second text object of the document and identifying a second text topic associated with the second text object, determining a second degree of closeness between the second text topic and the media topic, and clustering the second text object with the text object when the second degree of closeness exceeds a threshold such that the second text object is part of the clustered article;

the method further comprises repeating steps (a)-(d) for a plurality of text objects and a plurality of image objects in the document, such that the indexed database comprises a plurality of clustered articles;

the method further comprises receiving a search query from a user via a user interface, and searching the indexed database based on the search query;

step (b) further comprises identifying a semantic or contextual object embedded within the image object;

step (b) further comprises identifying a semantic or contextual object embedded within the image object, and wherein the method further comprising linking the text topic and the semantic or contextual object to create a hierarchical interlinked data store;

the method further comprises: organizing the text topic in a text hierarchy; organizing the media topic in a media hierarchy; and comparing the text hierarchy to the media hierarchy to cluster similar articles;

the media topic is identified using an object recognition method selected from an appearance-based method and a feature-based method;

the method further comprises identifying a time component from the document, and further comprising associating the clustered article with the time component such that the indexed database comprises time sequenced clustered articles;

the method further comprises repeating steps (a)-(d) for a plurality of text objects in a second document and a plurality of image objects in the second document, wherein the second document has a time component that differs from a time component of the document, such that the indexed database provides a time-sequence of clustered articles.

the method further comprises identifying a sentiment data associated with the text object or the image object, and associating the sentiment data with the clustered article;

the indexed database is further time indexed such that a prediction engine can predict an event for a specific entity (e.g., preparing a template for the journalist); and the method further comprises printing a clustered article from the indexed database.

In an aspect is a system for carrying out the method as above, the system comprising: a text engine that analyzes the text object and identifies a text topic associated with the text object; a media engine that analyzes the image object and identifies the media topic associated with the image object; a comparison engine that determines a degree of closeness between the text topic and the media topic; a cluster engine that clusters the text object and the image object to form a clustered article when the degree of closeness is within a threshold. In embodiments:

the system further comprises a cognitive engine that analyzes the image object and identifies a semantic or contextual object embedded within the image object;

the system further comprises an alignment engine that links the text object, the contextual object, and optionally other metadata extracted from a corpus of documents, and creates hierarchically interlinked data store.

In an aspect is a system comprising: a processor; a memory couple to the processor, the memory configured to store program instructions for instructing the processor to carry out the steps: (a) analyzing a text object of an electronic document and identifying a text topic associated with the text object; (b) analyzing a image object of the document and identifying a media topic associated with the image object; (c) determining a degree of closeness between the text topic and the media topic; and (d) when the degree of closeness exceeds a threshold, clustering the text object with the image object to form a clustered article, and adding the clustered article to an indexed database. In embodiments:

the system further comprises a printer component configured to print a time sequenced series of clustered articles from the indexed database;

the system further comprises a predictor component configured to form a prediction form the indexed database;

the system further comprises an interface, wherein the interface presents a user with a search function that searches the indexed database;

the system further comprises one or more components selected from: a printer component configured to print a time sequenced series of clustered articles from the indexed database, a predictor component configured to form a prediction form the indexed database; and a labeling component configured to digitally label the clustered article based on the text topic or image topic;

the system further comprises a user interface comprising a search function, the search function configured to search the indexed database for a clustered article upon receiving a search query from a user;

the system further comprises a user interface comprising a display function, the display function configured to display a clustered article from the indexed database in a continuous output; and the system further comprises a labeling component configured to digitally label the clustered article based on the text topic or image topic.

In an aspect is a method for clustering related articles in a publication, the method comprising: forming a content distance matrix from at least one text topic vector associated with at least one text object in the publication and at least one image topic vector associated with at least one image object in the publication, wherein each element $m_{i,j}$ in the content distance matrix is calculated by combining the topic vectors according to their score, and wherein each element $m_{i,j}$ in the content distance matrix refers to an object i and an object j; and comparing each element $m_{i,j}$ of the content distance matrix with a threshold, and if the element meets or exceeds the threshold, digitally clustering the objects i and j.

These and other aspects of the invention will be apparent to one of skill in the art from the description provided herein, including the examples and claims.

DETAILED DESCRIPTION OF VARIOUS EMBODIMENTS

Figure 1:
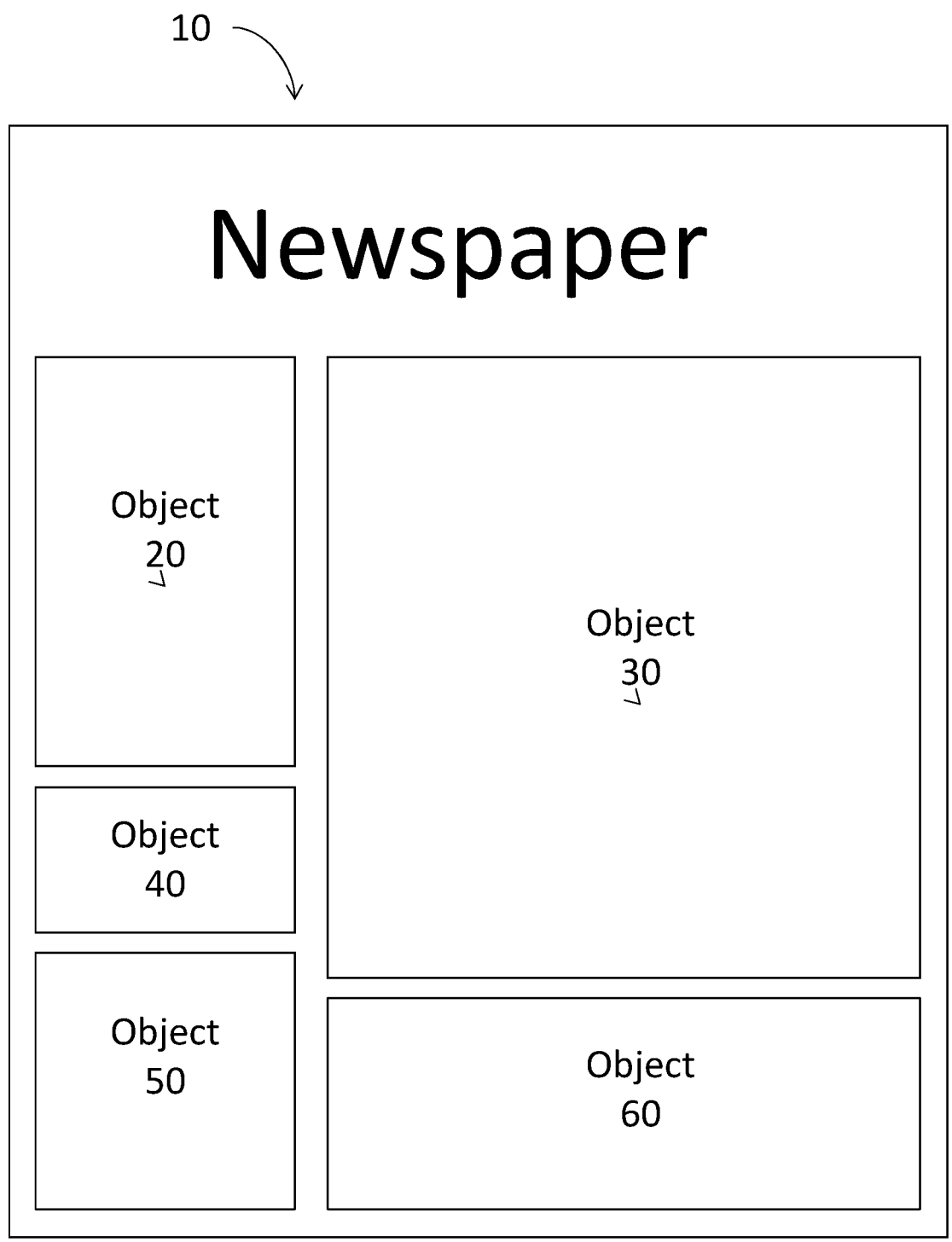
FIG. 1 provides a sample layout of a typical newspaper page.

Throughout this disclosure, a newspaper will be used as an exemplary publication. However, it will be appreciated that this is done merely for convenience in describing aspects of the inventive systems and methods, and is not meant to be limiting. Thus unless otherwise indicated or clear from the text, the term "newspaper" can be replaced with other printed media such as journals, magazines, and the like. Also throughout this disclosure, the term "article" is used as exemplary and representative of a variety of continuous or connected writings (with or without images), and is meant to encompass other varieties including stories (fictional or non-fictional), commentaries, critiques, and the like.

Newspapers and the articles therein may be in print format, in which case the methods herein first involve digitization of the articles using standard means. Alternatively the articles may be received in digitized format, in which case there is no need for digitization of the article as part of the disclosed method.

Also throughout this disclosure, the term "image" is used to refer to a broad range of multimedia, and includes pictures, drawings, graphs, and charts, with or without embedded text.

Throughout this disclosure, the term "object" is used to refer to an area of a newspaper page that may be selected from a text area, an image, or a combination of text and image. The content within a single object, whether image, text, or both, is related—i.e., part of the same article. As used herein, an "image object" contains an image and may further contain a portion of associated text (whether imbedded in the image or not). Each object may be independently selected from a text object and an image object.

In embodiments, a single article may include multiple objects, which objects may be spread over a single page and/or multiple pages of a newspaper. In some cases, articles may be spread over time across several newspapers editions (e.g., an object in two or more newspapers published at different times).

Herein is provided methods and systems for the automatic detection of articles in a newspaper page using the information extracted from the multimedia content in the page, i.e. images. In embodiments, the detection process depends on the semantic information extracted from both the images and the text, and such semantic information is compared in order to detect those objects belonging to the same story.

In an embodiment, the method involves detecting pictures and text areas in a newspaper page—this identifies the objects on the page. Then, the method involves extracting the semantic information from the images and the text areas in the newspaper's page. The images and text are treated separately as described below.

In embodiments, herein is provided a system comprising: an input device; a text engine that analyzes the text objects; a media engine that analyzes the image objects; a cognitive engine that analyzes the image objects; an alignment engine that intelligently links the textual data, contextual data and other metadata extracted from the input corpus; a comparison engine that determines a degree of closeness between the text topics of one or more of the text objects and the media topics of one or more of the image objects; and a cluster engine that clusters text objects and image objects to form a cluster when the degree of closeness is within a threshold, wherein the cluster is a single article that contains the related text objects and image objects.

In an aspect is a method comprising the steps: (a) analyzing a text object of an electronic document and identifying a text topic associated with the text object; (b) analyzing an image object of the document and identifying an image topic associated with the image object; (c) determining a degree of closeness between the text topic and the image topic; and (d) when the degree of closeness exceeds a threshold, clustering the text object with the image object to form a clustered article, and adding the clustered article to an indexed database.

In an aspect is a method for clustering related articles in a publication, the method comprising: forming a content distance matrix from at least one text topic vector associated with at least one text object in the publication and at least one image topic vector associated with at least one image object in the publication, wherein each element $m_{i,j}$ in the content distance matrix is calculated combining the topic vectors according to their score, and wherein each element $m_{i,j}$ in the content distance matrix refers to an object i and an object j; and comparing each element $m_{i,j}$ of the content distance matrix with a threshold, and if the element meets or exceeds the threshold, digitally clustering the objects i and j.

In embodiments, the methods herein involve determining a set (represented herein as {C}) of possible topics. These are topics that may be present in an article and will generally be selected to ensure that all possible topics are covered by the set. The set of topics may be input manually, or in other embodiments, the set may be determined automatically by analysis of a sample/control newspaper corpus. Each topic may be subdivided so as to allow for narrower and narrower sub-topics (e.g., passenger cars as a subset of vehicles). Selection of topics and their subdivision may be at the discretion of the operator of the system, and may be selected at least in part based on the topics expected to be found in the newspaper corpus. Furthermore, a topic set may be expanded or modified (either manually or automatically based on word recognition, etc.) if an article is encountered that doesn't fit well in the topic set. Throughout this disclosure, there are described "text topics" (i.e., topics covering the text of an object) and "image topics" (i.e., topics covering the image of an object) although these will generally be selected from the same set of topics.

In embodiments, the system will determine more than one topic for an object. This may occur when the object relates to a plurality of topics, and/or when a wide variety of words or images in the object make it difficult for the system to identify the most relevant words/images. In embodiments, then, the text topics are organized in a text hierarchy, ranked by expected relevancy. In embodiments, the image topics are also organized in an image hierarchy, ranked by expected relevancy. Determination of hierarchies may evolve over time as the system encounters more and more newspapers, particularly where machine learning algorithms are employed in the engines used to extract topics and create hierarchies. The hierarchies may be of any desired or appropriate length (i.e., any number of topics may be assigned to an object).

The systems and methods herein involve identification of text topics and image topics (and their hierarchies, when present), and comparing the identified topics to determine a degree of closeness. In embodiments, the comparison is carried out by a comparison engine. The degree of closeness is a variable that indicates the relation between two objects—two objects with a small degree of closeness are unlikely to be from the same article, whereas two objects with a very large degree of closeness are more likely to be from the same article. The methods/systems herein involve selecting an appropriate threshold value, and comparing the determined degree of closeness with the threshold value. When the threshold value is met or exceeded, two objects are considered to be related (and therefore part of the same article). When the threshold is not met or exceeded, the two objects are considered to be part of different articles. Two objects with a degree of closeness that meets or exceeds the selected threshold are then clustered (e.g., by a clustering engine)—i.e., the content from the objects is aggregated to form a single object, and possibly further clustered with other objects. The aggregated objects are also referred to herein as a clustered article, and in embodiments, the clustering of objects is carried out by a cluster engine. The clustered objects are considered to be a single article, and are then stored in a database in a searchable and indexed fashion to assist with further processing and analysis. The resulting searchable store of clustered articles is also referred to herein as an indexed database.

The above methods are repeated as many times as necessary until some, most, or all of the relationships between objects in a newspaper corpus have been determined, as desired. If no clustering occurs after such processing, the threshold value can be lowered and the process repeated until clustering is observed. If too much clustering is observed (i.e., objects that are not, in fact, related are clustered), the threshold value can be increased and the process repeated until the appropriate amount of clustering is observed.

The above methods may also be repeated with a plurality of newspaper corpuses. Where two newspaper corpuses differ in their publication dates, such procedure allows aggregation of objects (and formation of clustered articles) over a span of time In embodiments, the topic extraction process for text is performed by a text engine that analyses the text associated with a text object. Analysis involves, in embodiments, optical character recognition (when necessary) and isolation/identification of key words or phrases. Examples of identification methods may include frequency counting, sentence structure analysis, or the like. In embodiments, the text engine identifies a semantic object in the text of the text object. The semantic object may be used to determine the text topic or the text topic hierarchy for the text object. Alternatively or in addition, in embodiments, the methods comprise identifying a sentiment data associated with the text object. Such sentiment data may also be used in determining an appropriate text topic or text topic hierarchy. The sentiment data may be an interpretation of the text based on certain key words (e.g., emotive words, etc).

In embodiments, the topic extraction process for images is performed by a media engine using an object recognition technique. Examples of common object recognition techniques include appearance-based techniques and feature-based techniques. Implementation of such techniques for determining topics is within the skill in the art. For example, U.S. Pat. No. 7,756,871 (incorporated herein by reference) describes an article extraction methodology based on different techniques (such as presentation analysis, table of content analysis, layout-based analysis, punctuation-based analysis, language model analysis, part of speech analysis, semantic analysis, advertisement analysis, and conclusion detection) to recognize text boxes belonging to the same article. However, such techniques ignore the large body of information and contextual knowledge embedded within the multimedia. Alternatively or in addition, in embodiments the methods/systems comprise a cognitive engine that is configured to analyze an image object and identify a semantic or contextual object embedded within the image object. The semantic or contextual object may be used in determining an appropriate image topic or image topic hierarchy for the image object. For example, the cognitive engine can analyze an image, recognize a human figure performing an action, and associate a image topic relating to the human figure and the action. Alternatively or in addition, in embodiments, the methods comprise identifying a sentiment data associated with the image object. Such sentiment data may also be used in determining an appropriate image topic or image topic hierarchy.

In embodiments, the methods herein comprise linking the text topic of a text object with the semantic or contextual object of an image. Alternatively or in addition, in embodiments, the methods comprise linking the text topic of a text object with the image topic of an image object. Alternatively or in addition, in embodiments, the methods comprise linking the text topic of a text object with the text topic of another text object. Such linking may be carried out, e.g., by the clustering engine referred to herein. Alternatively or in addition, the linking may be carried out by an alignment engine. The foregoing linking enables creation of a hierarchical interlinked data store, also referred to herein as an indexed database. In some embodiments, the clustering engine can subsume (i.e., take over all of the functions of) the alignment engine.

In embodiments, it is necessary or desirable to determine a time component for an object. The time component, generally, is the date upon which the object appeared in print—i.e., the publication date. This may be extracted, for example, as metadata from a newspaper corpus, and then applied to every object extracted from the same corpus. With a time component as metadata, the extracted and aggregated articles can be time sequenced and further indexed for improved searchability. For example, a time evolution for a specific topic or topic hierarchy can be determined in an index of extracted articles with time stamps.

In embodiments, the time stamp metadata in an indexed database is further helpful to enable a prediction engine to predict an event. For example, the prediction engine can predict an event based on a specific entry or time-sequenced series of entries in the indexed database. As a specific example, a template for a journalist wishing to do a follow-up story on a topic can be generated by the prediction engine based on the time-sequenced articles stored in the indexed database. In embodiments, a prediction engine may not require a time-stamped sequence of aggregated articles—e.g., a single aggregated article in the indexed database may be sufficient for a prediction as mentioned. The prediction engine is an example of a predictor component that may be incorporated into the devices/methods herein, which component is configured to form a prediction from the indexed database.

In embodiments, the indexed databases made by the systems/methods herein have historical data for online and offline cognitive services such as predictions as described herein.

The systems herein may further comprise a labeling component. The labeling component, in embodiments, will be configured to digitally label a clustered article based on the text topic and/or the image topic that was associated with one or more of the objects that were used to form the clustered article. In embodiments, such labels are used to index the indexed database. Other labels and metadata (e.g., to time stamps) may also be used to index the indexed database. All data originally from an object (e.g., text and images) as well as data determined by the system herein (e.g., topics, semantic objects, sentiment data, etc.) remain with the object, and therefor with the clustered article incorporating an object, in the indexed database. Accordingly, in embodiments, the semantic objects, topics, sentiment data, text, text objects, contextual objects, and other data are searchable in the indexed database.

The systems herein further comprise (and the methods herein further utilize) an input device and an output device. The system may comprise a plurality of input devices and/or a plurality of output devices as desired or appropriate. Each input and output device comprises the physical device as well as the machine-readable instructions (stored in memory in the system or anywhere else practicable to operate the device) necessary to control the device and carry out the functions as described herein and as is typical for the specific device. In embodiments a hardware interface is present to the system direct from an input device and/or network that receives physical signals from the input devices representative of the text input. In embodiments a hardware output is present providing physical signals to network and/or hardware output device(s).

The input device is any input device suitable for inputting an electronic document or, in embodiments, for creating an electronic document from a physical document. Example input devices that are suitable for creating an electronic document from a physical document include an optical scanner and a camera. Example input devices that are suitable for inputting an electronic document include a data port for reading data from an external portable storage medium (e.g., a USB port or the like), a data link to a data network, a device for reading digital portable storage media (e.g., a DVD device or the like), and the like.

The output device is any output device suitable for outputting a clustered article or a plurality of clustered articles. Output devices include devices that create physical representations of a clustered article, such as a printer or an optical display (including an optical display that is configured to display a clustered article on a user interface). Output devices also include devices that create and store a digital representation of a clustered article (e.g., a data file), such as a data link to a data network (e.g., to store the data file in a remote storage device such via cloud storage), a local non-volatile data storage medium such as a hard disc drive or the like, a port configured to receive a portable data storage medium such as a USB port or the like, and an output device configured to read/write a portable data storage medium such as a writeable DVD drive. Additional details of some of the output and input devices are described herein.

The systems herein may comprise a printer component. The printer component is used to create physical output, such as time-sequenced series of clustered articles identified in the newspaper corpus and stored in the indexed database. The output of the systems/methods herein include printing (i.e., physically reproducing) a clustered article from the indexed database. The output of the systems/methods herein further include digitally reproducing a clustered article from the indexed database.

In embodiments, the system further comprises a user interface. The user interface is designed to assist a user with searching and otherwise making use of the indexed database. In embodiments, the interface comprises a search function, the search function configured to search the indexed database for a clustered article upon receiving a search query from a user. The user can input a topic or set of topics and the search function can, for example, return any clustered article (or time sequenced series of clustered articles) that is also associated with the topic—whether the clustered article has the same or similar text topic, image topic, or both text and image topic. In embodiments, the system further comprises a user interface comprising a display function, the display function configured to display a clustered article from the indexed database in a continuous output. By "continuous" is meant that the article is not fragmented or otherwise unconnected from beginning to end—there are no breaks and continuations of the article as is common in a newspaper layout. The article (along with any associated images) can be viewed from beginning to end on an output device (e.g., a screen or printer).

Although a variety of algorithms may be used to carry out the inventive methods, certain example algorithms and algorithmic features are described below. Such examples are not intended to be limiting, and are provided merely to further illustrate various aspects of the invention.

To deal with images, the system/method recognizes that, in most cases, a image is accompanied with at least one of three types of text—the first type is a caption which directly explains the image, the second type is text that may be part of an article and may reference the image or some aspect of the image, and the third type is text that is part of the image itself (e.g., labels on charts, written signs in a picture, etc.). Two or all three of these types of text may be present and associated with an image. Recognized images are analyzed to extract a set of topics (the set being referred to as {TV} herein) referring to the image or to which the image refers. These topics correspond to categories in an internal taxonomy. In embodiments, the topic extraction process is performed using object recognition techniques mainly belonging to one of the following categories: appearance-based and feature-based methods. Other methods may be used as appropriate. In embodiments, the complete list of all topics {C} in the taxonomy is generated on a training set of images. In analyzing an object, each topic is associated with a score {S} for the specified text area. The result of this phase is a topic vector {TV} containing N tuples [$T_i$, $S_i$] for each image.

To deal with text objects, the text content of the text object is extracted, for example using standard Optical Character Recognition (OCR) tools. An analysis on the text is performed to extract a set of topics (referred to herein as {TV}) to which the text refers. These topics correspond to categories in the internal taxonomy described herein. Again, the complete set of categories {C} is trained from a training set of newspapers' articles and text corpus in general. Each topic for a text object is associated with a score {S} for the specified text object. The result of this phase is a topic vector {TV} containing N tuples [$T_i$, $S_i$] for each text box.

Once the images and text are recognized and analyzed, the system semantically matches the content of the images with the content of the different text boxes. The final goal is to merge those text boxes that are likely to be part of the same story referred to in an image. A content distance matrix between the vectors {TV} is computed between the images and each text object. The content distance gives the semantic similarity score between the image and the text object. Text objects with a similar semantic score calculated with respect to an image are likely to belong to the same article in the page, and the system clusters such objects together.

The systems described herein provide the automatic detection of printed media (e.g. newspapers) using the information extracted from multimedia content (i.e., images). In embodiments, objects (images and text boxes) are extracted from a newspaper page. A topic vector {TV} is generated from each object in the page according to object detection techniques for images and semantic extraction tools for text boxes. The topic vector {TV} is composed by a set of tuples [T, S] composed by a topic T and a score S assigned to that topic for the specific element. The topic is extracted from a list of all possible topics {C} which is represented as a semantic taxonomy. In embodiments, each topic comprises up to 4 different levels/1/2/3/4, wherein level one is more general and level four is more specific (e.g. hobbies/games/board games/chess). The distance between topic vectors is calculated according to an algorithm that takes into account the level of the topic and the score. A content distance matrix is generated. From the content distance matrix the text boxes are clustered in article stories. The algorithm compares topic vectors and computes the content distance matrix that accounts on the similarity of the topics, according to the four levels in the taxonomy and the scarcity of the topic in the newspaper page. A clustering methodology accepts as input the distance matrix described above and outputs the clustered articles. The linked dataset generated from the article clustering process enables analytics for more intelligent online and offline cognitive services.

In embodiments, the systems described use visual clues to detect articles and relate text objects (e.g., article fragments) to form complete articles. The visual clue may involve identifying within an image a human subject, and then clustering the image with a text object that discusses human subjects (as determined by OCR and analysis of the text). In embodiments, the system focuses on the text inside each text object to identify repeating and/or related words and thereby cluster text objects. It is recognized that text analysis alone is prone to errors since the same word can have different meanings in different contexts. Concurrent use of the image context and information helps to avoid this difficulty. Furthermore, syntactic analysis also allows detection of incomplete sentences and text blocks that are split between two text objects.

With reference to FIG. 1, there is shown an example newspaper page 10. The page has a variety of Objects (20, 30, 40, 50, and 60), which Objects may be selected from text, an image, or a combination of text and image. Some of the Objects may be related, although it is also possible that all objects on the page are unrelated. For example, in an embodiment, Object 20 and Object 50 are both text objects and are unrelated. Object 40 is an advertisement with text and optionally an image (e.g., a logo or a spokesperson). Object 60 is text, and Object 30 is a combination text with image (the image being related to the text). Some or all of Objects 20, 30, 50, and 60 may be the beginning of articles, and may be continued on later pages of the newspaper corpus. In an alternative embodiment, Objects 20 and 50 comprise text and are part of the same article, but the article is interrupted by Object 40 (e.g., an unrelated advertisement). One or both of Objects 20 and 50 may further comprise an image. A variety of alternative embodiments are possible and are likely to be encountered for newspapers spanning long periods of time and wide geographic areas. The invention herein is ideally suited for processing these various embodiments, clustering articles, and forming coherent, searchable databases from the original newspapers.

Figure 2:
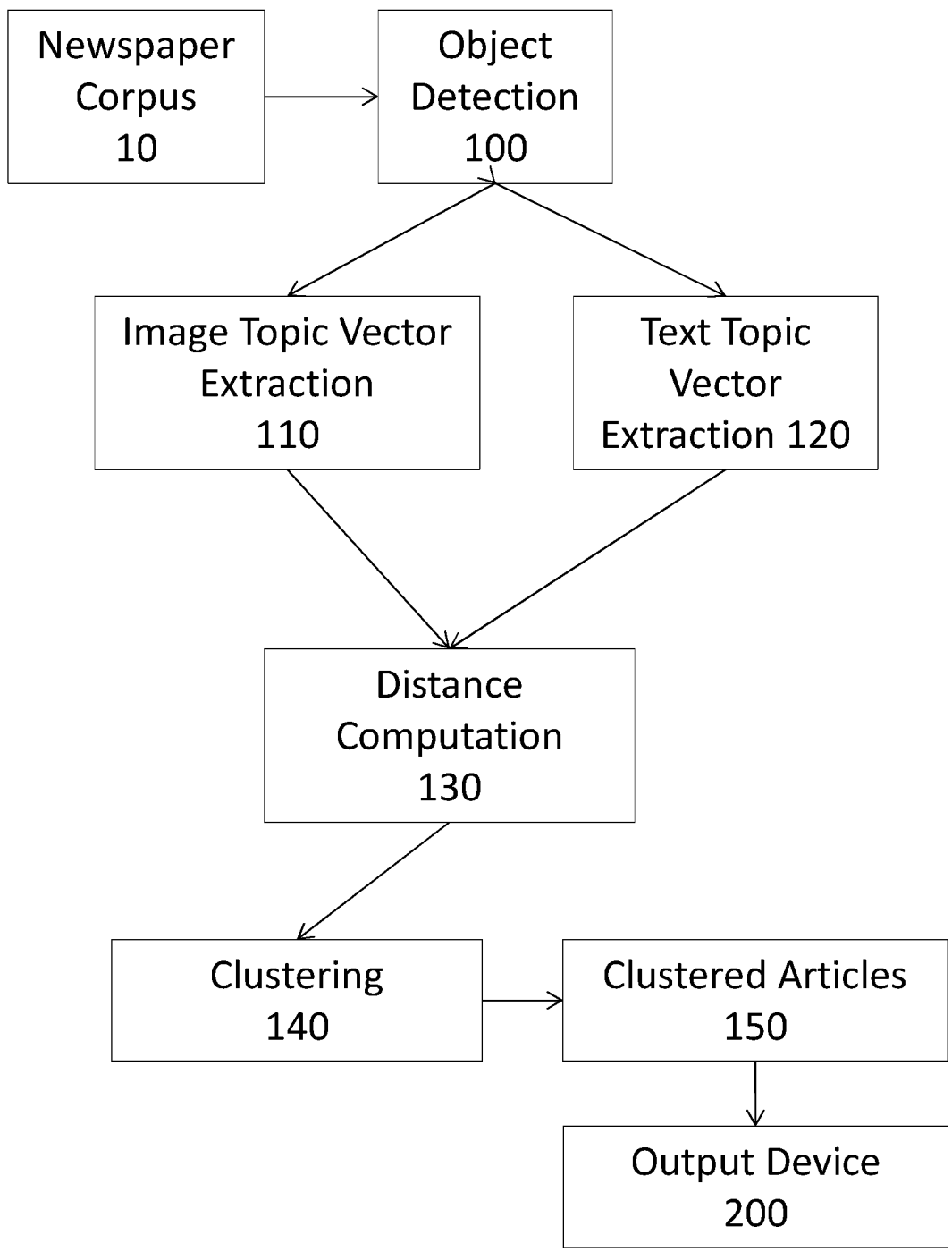
FIG. 2 provides a system flowchart for a system embodiment, with various processes, according to the disclosure.

With reference to FIG. 2, there is shown a flowchart for a method according to an embodiment of the invention. The method begins with newspaper corpus 10, which may be a single newspaper page, a plurality of newspaper pages from a single day, a complete newspaper for a day, or a plurality of newspapers spanning a plurality of days. Newspaper corpus 10 may also be referred to herein as a "dataset".

The newspaper corpus 10 is scanned (step not shown in the figure) if it is not already in digital format. Scanning may be any conventional or later-developed method for converting an analog print media to a digital representation of the print. Newspaper corpus 10 may comprise a set of n pages $P_1 \ldots P_n$. All page are individually subjected to object detection 100. Object detection 100 isolates as input a single newspaper page from the dataset and generates a list of objects: images and text boxes. For example, for page $P_i$, object detection 100 identifies the set of images and text, referred to as {I,T}. These two objects are individually further processed for extraction. Objects with both image and text are treated as an image object.

The set of images for page $P_i$ is referred to as $\{I_1, I_2, \ldots I_K\}$, and the set is sent to Image Topic Vector Extraction 110, which generates a vector {TV} of N topics T with an associated score S for the K images in the page $\{\{[T_{1,1}, S_{1,1}], \ldots, [T_{N,1}, S_{N,1}]\}, \ldots, \{[T_{1,K}, S_{1,K}], \ldots, [T_{N,K}, S_{N,K}]\}\}$. The list of possible topics {C} are fed into the system (or determined from a sample set of images) as a semantic taxonomy, composed of up to 4 levels {/1/2/3/4} with level 1 being more general and level 4 more specific. This taxonomy may be trained from images belonging to an external corpus. The image is analyzed using object recognition techniques that can be selected through a configuration block. In embodiments, such techniques can be grouped in two main categories: appearance-based and feature-based methods. The former uses example images of the objects to be recognized to perform the recognition while the latter searches for feasible matches between object features and image features. Finally, extract the main elements in the image that have then to be compared with the taxonomy to generate the topic vector.

The set of text for page $P_i$ is referred to as $\{T_1, T_2, \ldots T_P\}$, and the set is sent to Text Topic Vector Extraction 120 generates a vector {TV} of N topics T with an associated score S for the P text boxes in the page $\{\{[T_{1,1}, S_{1,1}], \ldots, [T_{N,1}, S_{N,1}]\}, \ldots, \{[T_{1,P}, S_{1,P}], \ldots, [T_{N,P}, S_{N,P}]\}\}$. The list of possible topics {C} are fed into the system as a semantic taxonomy, composed of up to 4 levels {/1/2/3/4} with level 1 being the most general and level 4 more specific. This taxonomy may be trained from text belonging to an external corpus. The text is analyzed using semantic extraction tools and the topic vector is generated. In embodiments, the analysis is based on the detection of the context of the text and each word is compared with the trained corpus in order to extract the topic belonging to it. An average of the topics is performed in order to select the 3 most common and generate the topic vector.

The output of Topic Vector Image Extraction 110 (e.g., $\{\{[T_{1,1}, S_{1,1}], \ldots, [T_{N,1}, S_{N,1}]\}, \ldots, \{[T_{1,K}, S_{1,K}], \ldots, [T_{N,K}, S_{N,K}]\}\}$) and Text Topic Vector Extraction 120 (e.g., $\{\{[T_{1,1}, S_{1,1}], \ldots, [T_{N,1}, S_{N,1}]\}, \ldots, \{[T_{1,P}, S_{1,P}], \ldots, [T_{N,P}, S_{N,P}]\}\}$) are passed to Distance Computation 130, which module computes distances between related images and text boxes. A list of topic vectors {TV} is fed into the component and a content distance matrix is generated. For each element in the page N topics are generated with their scores. The value N is determined dynamically based on the topic the subject (e.g. newspaper) under analysis. The matrix is a symmetric M×M matrix, where M is the number of topic vectors fed into this block (K+P) where K is the number of topic vectors for the images and P is the number of topic vectors for the text boxes fed into this block. Each value in the matrix is calculated combining the topic vectors according to their score, taking into account the levels in the taxonomy of the topic and the score {S}, together with an estimation of the scarcity of the topic in the page. For example, Level 1 is the more general and level 4 is more specific. For 2 elements in the page that match one of their topic at level 4 the similarity is higher respect to the match of a topic at level 1.

From Distance Computation 130, the data is passed to Clustering 140, which module takes as input the distance matrix and clusters the text boxes belonging to the same article. Different approaches can be applied. For example, each element $m_{i,j}$ in the distance matrix is analyzed and compared with a threshold. If the value is above the threshold, then the 2 elements the cell is referring to, I and J are clustered together. The second approach considers all the elements previously added to the partial cluster and not only one element. A third approach merges the text content of the blocks belonging to the cluster and the distance matrix has to be recomputed at every iteration. From clustering 140, the result is clustered article 150, which may be output (via output device 200) and/or stored such as in a database on the system.

Figure 3:
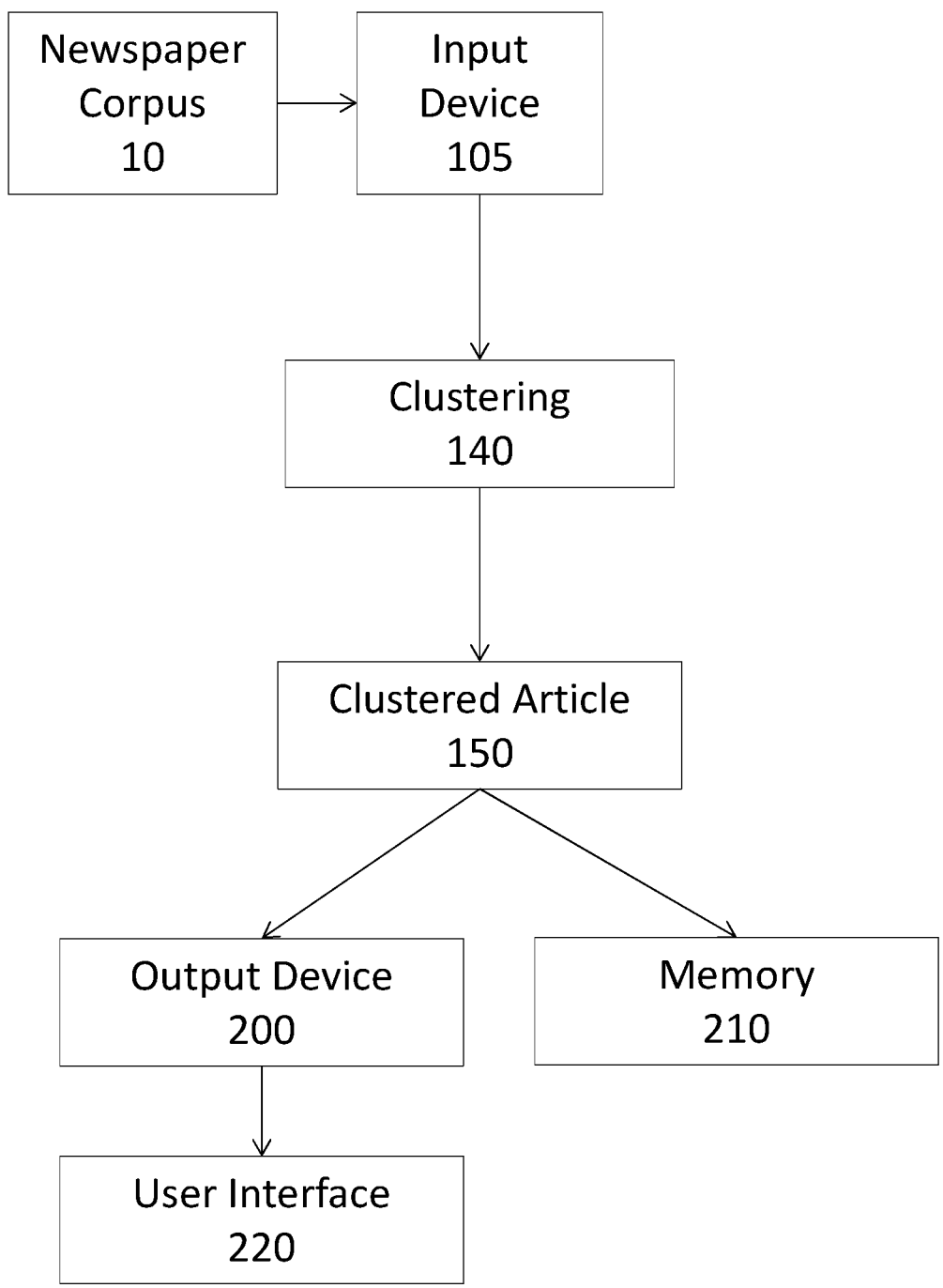
FIG. 3 provides a system flowchart for a system embodiment, with various processes including input and output, according to the disclosure.

With reference to FIG. 3, there is shown a flowchart for a method according to an embodiment of the invention. As with FIG. 2, the method begins with newspaper corpus 10 that is input into the system via input device 105. The system creates clustered article 150, and clustered article 150 is output via output device 200 (which may include user interface 220) and/or stored in memory 210.

Figure 4:
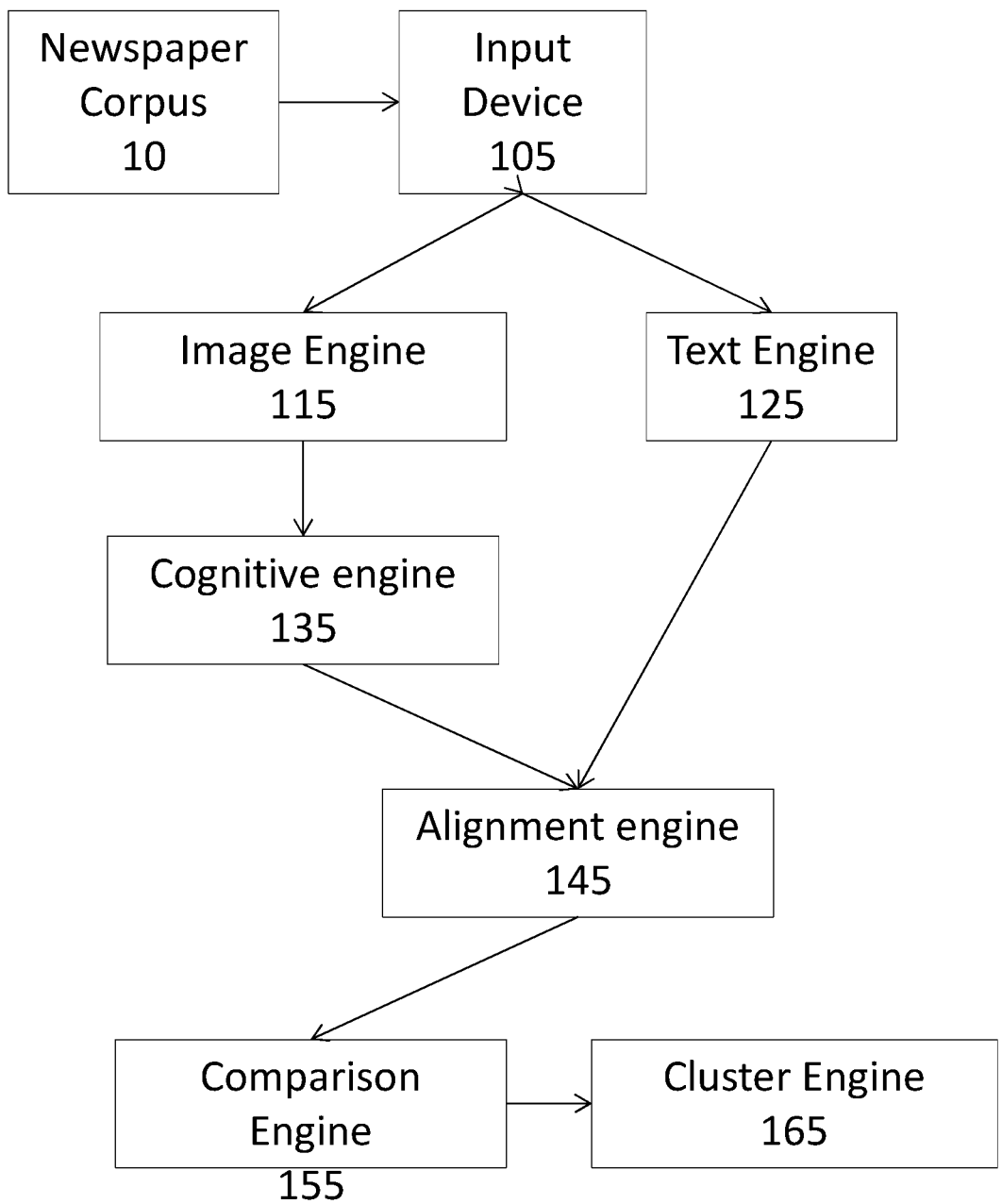
FIG. 4 provides a system flowchart for a system embodiment, with various engines, according to the disclosure.

With reference to FIG. 4, there is shown a flowchart for processing newspaper corpus 10 through the cluster stage. Newspaper corpus 10 is processed by input device 105. Examples of an input device are provided herein and include a digital scanner or the like. Input device 105 receives one or more newspapers as part of newspaper corpus 10, the newspapers having one or more text objects and one or more image objects (e.g. pictures, etc.). The input newspapers are passed to text engine 125 that analyses the text objects and identifies one or more text topics associated with the respective text object. The input newspapers are also passed to image engine 115 that analyses the image objects and identifies one or more image topics associated with the respective image object. Cognitive engine 135 then analyses the image objects and identifies one or more semantic and contextual information embedded within the respective image object. Alignment engine 145 receives output from cognitive engine 135 and text engine 125, and intelligently links the textual data, contextual data and other metadata extracted from the corpus and creates hierarchically interlinked data store (e.g., to allow cognitive services such as context aware search). Comparison engine 155 then determines a degree of closeness between the text topics of one or more of the text objects and the image topics of one or more of the image objects. Cluster engine 165 then clusters text objects and image objects to form a cluster when the degree of closeness is within a threshold, wherein the cluster is a single article that contains the related text objects and image objects.

Figure 5:
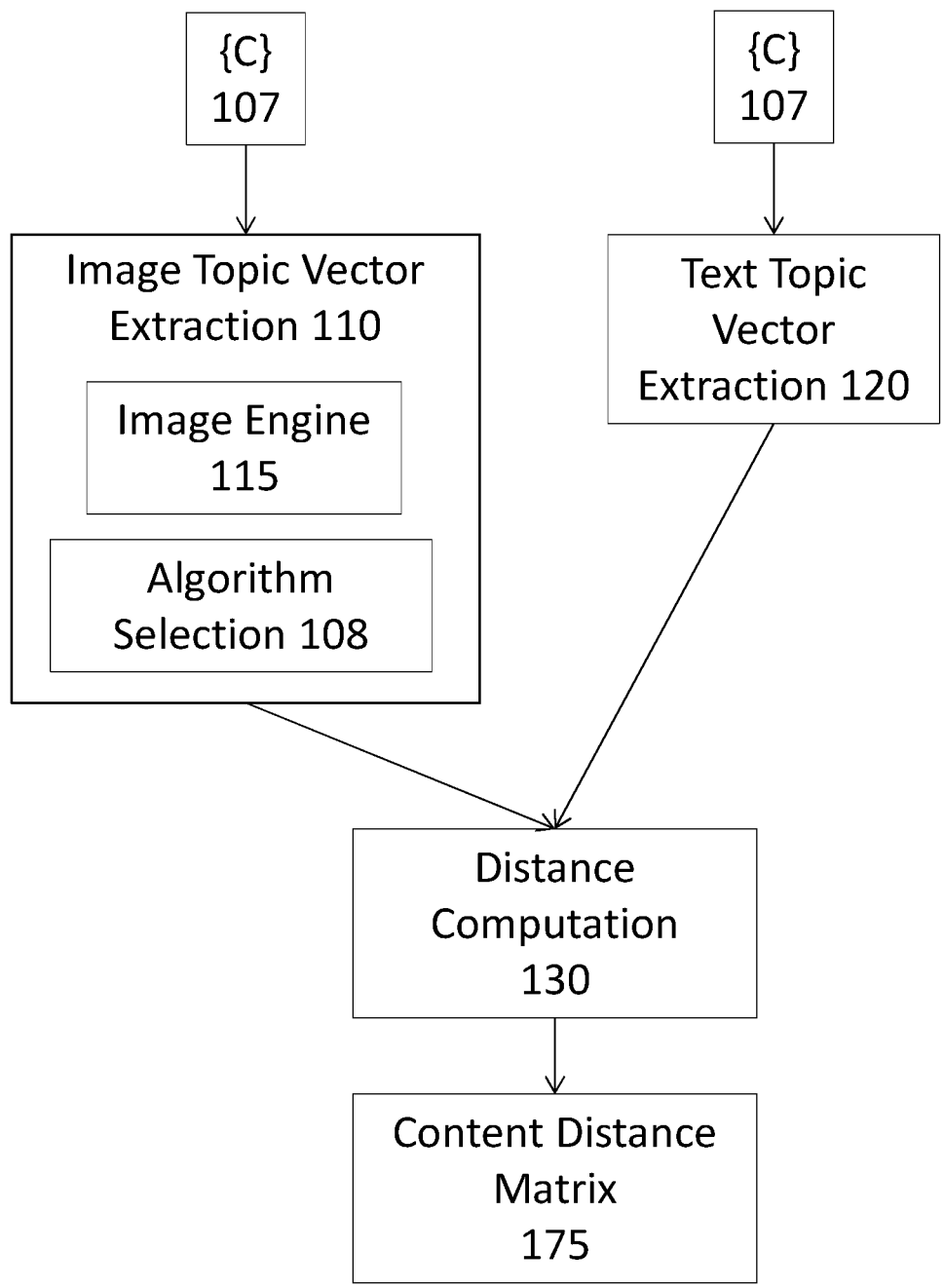
FIG. 5 provides further details of an embodiment according to the disclosure for the creation of a content distance matrix.

With reference to FIG. 5, more detail is shown for an embodiment of the extraction and analysis of image and text objects. Image topic vector extraction 110 receives an additional input (aside from objects detected in a newspaper), that is, {C} 107, which is a set of all possible topics that may be found in articles. This set is fed into the system as a semantic taxonomy and may be determined from a control newspaper corpus or input manually. Image topic vector extraction comprises image engine 115 and uses algorithm selection 108 in order to select the appropriate algorithm for processing images. Text topics vector extraction 120 also receives {C} 107. The output from image topic vector extraction 110 and text topic vector extraction 120 are sent to distance computation 130 (as in FIG. 2), and the output of distance computation 130 is shown in FIG. 4 as content distance matrix 175.

The present invention enables analytics for more intelligent online and offline cognitive services. The semantically linked dataset extracted from the newspaper pages by means of the clustering technique described before can enable analytics for more intelligent online and offline cognitive services. Examples include the following. Smart search—enables a search engine not based on keywords but on semantic objects. Timeline—presents all the articles related to a specific entity on a timeline to see how that phenomenon evolved over time. Sentiment—detects how the opinion of a specific entity changed over time. Prediction—from historical data, we can predict an event for a specific entity, preparing a template for the journalist for example.

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

What is claimed is:

1. A method of clustering related objects in an electronic document, the method comprising the steps:

analyzing a text object of the electronic document and identifying a text topic associated with the text object;

analyzing an image object of the electronic document and identifying an image topic associated with the image object by identifying an image-based semantic or contextual object embedded within the image object;

determining a degree of closeness between the text topic and the image topic by forming a content distance matrix from at least one text topic vector associated with at least the text object in the electronic document and at least one image topic vector associated with at least the image object in the electronic document, wherein each element $m_{i,j}$ in the content distance matrix is calculated by combining the topic vectors according to their score, and wherein each element $m_{i,j}$ in the content distance matrix refers to an object i and an object j; and comparing each element $m_{i,j}$ of the content distance matrix with a closeness threshold;

when the degree of closeness exceeds a threshold, clustering the text object with the image object to form a clustered article, and adding the clustered article to an indexed database;

reducing the threshold in response to an insufficient amount of clustering and increasing the threshold in response to an excessive amount of clustering;

linking the text topic associated with the text object and the image-based semantic or contextual object to create a hierarchical interlinked data store; and altering a user interface to output the clustered article.

2. The method of claim 1, further comprising analyzing a second text object of the document and identifying a second text topic associated with the second text object, determining a second degree of closeness between the second text topic and a media topic, and clustering the second text object with the second text object when the second degree of closeness exceeds a threshold such that the second text object is part of the clustered article.

3. The method of claim 1, further comprising repeating the steps of the method for a plurality of text objects and a plurality of image objects in the document, such that the indexed database comprises a plurality of clustered articles.

4. The method of claim 1, further comprising receiving a search query from a user via a user interface, and searching the indexed database based on the search query.

5. The method of claim 1, further comprising:
organizing the text topic in a text hierarchy;
organizing the media topic in a media hierarchy; and
comparing the text hierarchy to the media hierarchy to cluster similar articles.

6. The method of claim 1, further comprising identifying a time component from the document, and further comprising associating the clustered article with the time component such that the indexed database comprises time sequenced clustered articles.

7. The method of claim 1, further comprising repeating the steps of the method for a plurality of text objects in a second document and a plurality of image objects in the second document, wherein the second document has a time component that differs from a time component of the document, such that the indexed database provides a time-sequence of clustered articles.

8. The method of claim 1, further comprising identifying a sentiment data associated with the text object or the image object, and associating the sentiment data with the clustered article.

9. The method of claim 1, wherein the indexed database is further time indexed such that a prediction engine can predict an event for a specific entity.

10. The method of claim 1, further comprising printing a clustered article from the indexed database.

11. A system for clustering related objects in an electronic document, the system comprising:
a text engine that analyzes a text object of an electronic document and identifies a text topic associated with the text object;
a media engine that analyzes an image object of the electronic document and identifies a media topic associated with the image object by identifying an image-based semantic or contextual object embedded within the image object;
a comparison engine that determines a degree of closeness between the text topic and the media topic, the comparison engine further configured to determine the degree of closeness by:
forming a content distance matrix from at least one text topic vector associated with at least the text object in the electronic document and at least one image topic vector associated with at least the image object in the electronic document, wherein each element $m_{i,j}$ in the content distance matrix is calculated by combining the topic vectors according to their score, and wherein each element $m_{i,j}$ in the content distance matrix refers to an object i and an object j; and
comparing each element $m_{i,j}$ of the content distance matrix with a closeness threshold;
a cluster engine that clusters the text object and the image object to form a clustered article when the degree of closeness is within a threshold, adding the clustered article to an indexed database, and linking the text topic associated with the text object and the image-based semantic or contextual object to create a hierarchical interlinked data store, the cluster engine configured to reduce the threshold in response to an insufficient amount of clustering and increase the threshold in response to an excessive amount of clustering; and
an interface engine for altering a user interface to output the clustered article.

12. The system of claim 11, further comprising a cognitive engine that analyzes the image object and identifies the image-based semantic or contextual object embedded within the image object.

13. The system of claim 11, further comprising an alignment engine that links the text object, the contextual object, and optionally other metadata extracted from a corpus of documents, and creates the hierarchically interlinked data store.

14. A system comprising:
a processor;
a memory couple to the processor, the memory configured to store program instructions for instructing the processor to carry out the steps:
analyzing a text object of an electronic document and identifying a text topic associated with the text object;
analyzing an image object of the document and identifying a media topic associated with the image object by identifying an image-based semantic or contextual object embedded within the image object;
determining a degree of closeness between the text topic and the media topic by forming a content distance matrix from at least one text topic vector associated with at least the text object in the electronic document and at least one image topic vector associated with at least the image object in the electronic document, wherein each element $m_{i,j}$ in the content distance matrix is calculated by combining the topic vectors according to their score, and wherein each element $m_{i,j}$ in the content distance matrix refers to an object i and an object j; and comparing each element $m_{i,j}$ of the content distance matrix with a closeness threshold;

reducing the threshold in response to an insufficient amount of clustering and increasing the threshold in response to an excessive amount of clustering;

when the degree of closeness exceeds a threshold, clustering the text object with the image object to form a clustered article, and adding the clustered article to an indexed database; and linking the text topic associated with the text object and the image-based semantic or contextual object to create a hierarchical interlinked data store.

15. The system of claim 14, further comprising one or more components selected from:

a printer component configured to print a time sequenced series of clustered articles from the indexed database, a predictor component configured to form a prediction from the indexed database; and a labeling component configured to digitally label the clustered article based on the text topic or image topic.

16. The system of claim 14, further comprising a user interface comprising a search function, the search function configured to search the indexed database for a clustered article upon receiving a search query from a user.

17. The system of claim 14, further comprising a user interface comprising a display function, the display function configured to display a clustered article from the indexed database in a continuous output.

\* \* \* \* \*